April 3, 1934.  O. HOVDA  1,953,409
DISHWASHING MACHINE
Filed July 27, 1931   3 Sheets-Sheet 1
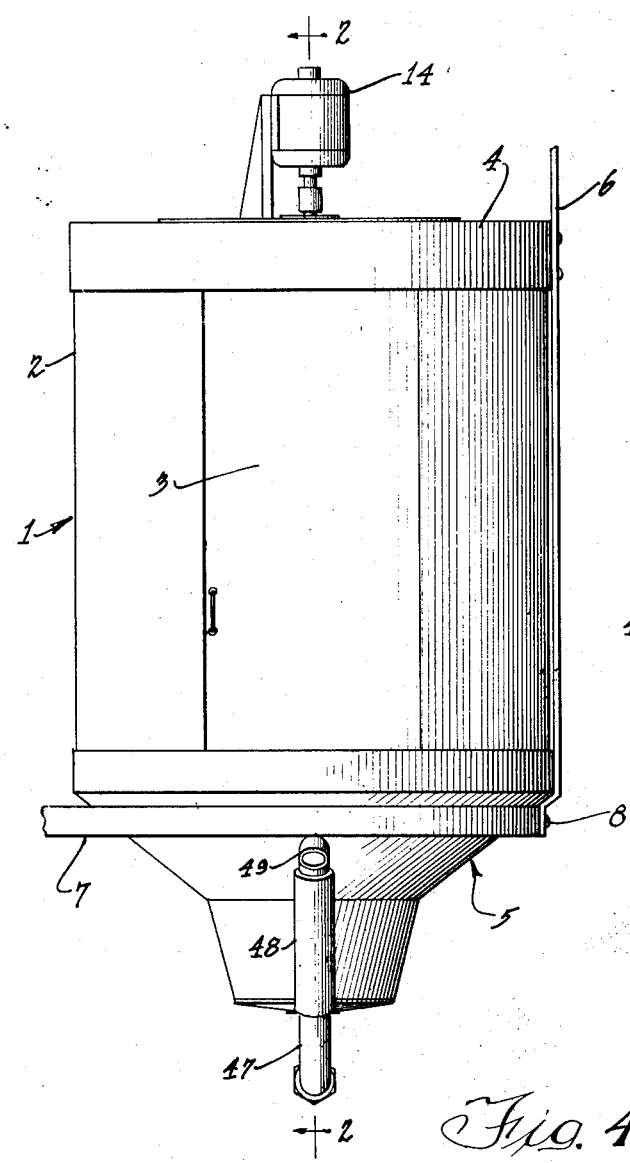
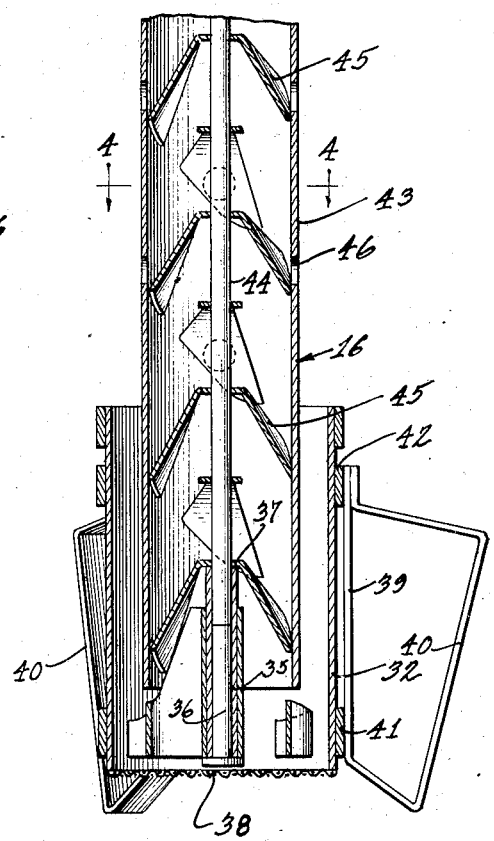
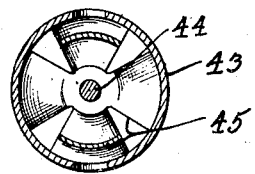
Inventor:
Olaf Hovda
By Munn & Co. Attys
Witness:
William P. Kilroy

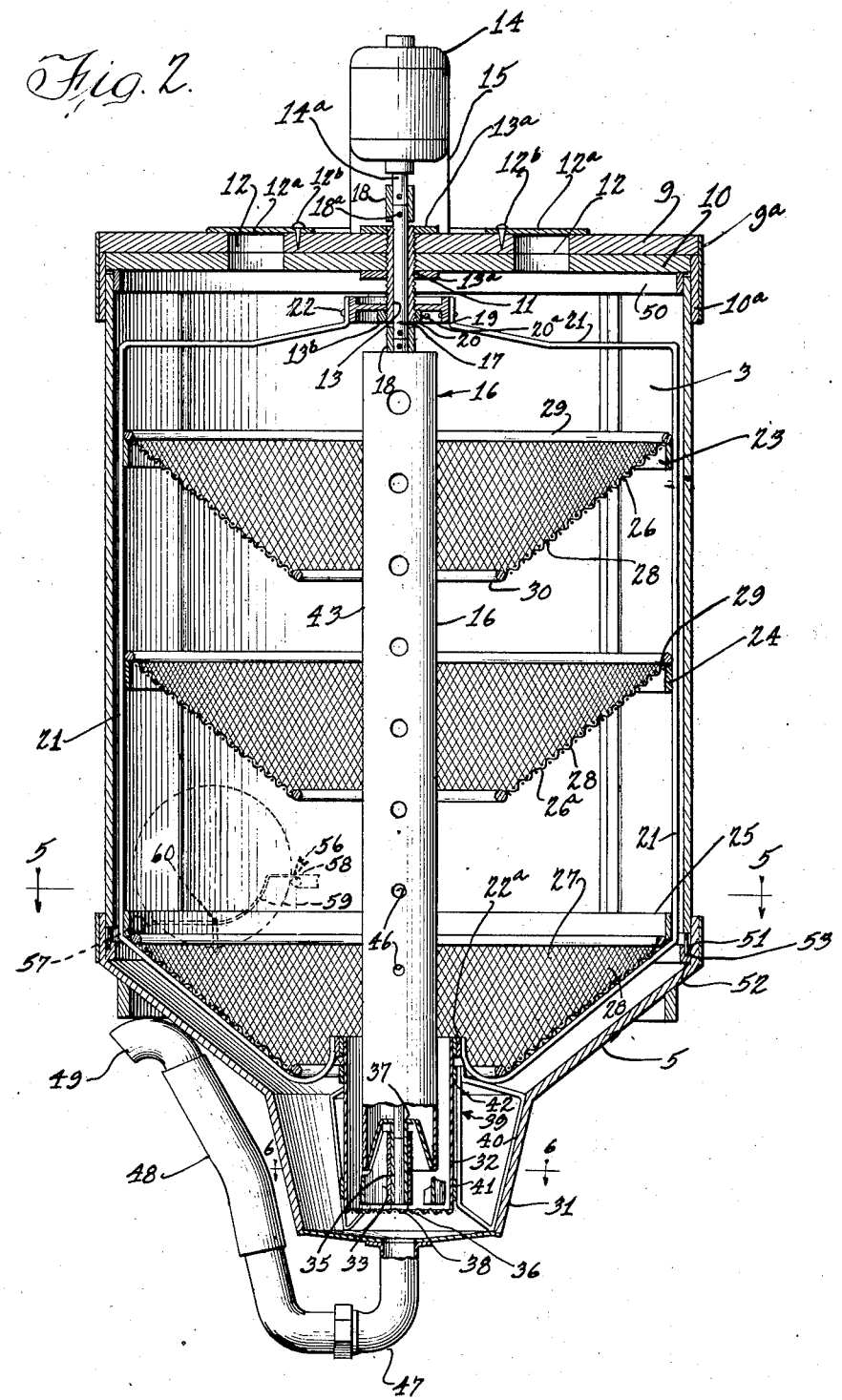

April 3, 1934.  O. HOVDA  1,953,409
DISHWASHING MACHINE
Filed July 27, 1931  3 Sheets-Sheet 3

Inventor:
Olaf Hovda

Witness:
William P. Kilroy

By Munn & Co. Attys

Patented Apr. 3, 1934

1,953,409

UNITED STATES PATENT OFFICE 1,953,409

DISHWASHING MACHINE

Olaf Hovda, Evansville, Ind.

Application July 27, 1931, Serial No. 553,396

2 Claims. (Cl. 141—9)

My invention relates to improvements in dish washing machines, and it consists in the combinations, constructions, and arrangements herein described and claimed.

An object of my invention is to provide a dish washing machine in which the dishes may be supported about a centrally disposed rotatable water cylinder which is adapted to raise the water from the lower portion of the machine and force it outwardly by centrifugal force through a plurality of openings in the cylinder upon the dishes.

A further object is to provide a means whereby the solid matter removed from the dishes may be prevented from returning to the water held in the bottom of the machine in order that the same water may be again used in cleansing the dishes.

A further object is to provide means whereby the dishes may be positioned at various levels around the water cylinder.

A further object is to provide means whereby the dishes placed in the upper portion of the machine may be cleansed as rapidly and as effectively as are the dishes positioned in the lower half of the device.

A further object is to provide means whereby the dish washing machine may be fixedly supported near the kitchen basin.

A further object is to provide means whereby the water in the washing machine may be easily removed.

A further object is to provide a dish washing machine which may be rapidly and easily cleansed.

A further object is to provide means whereby the dishes may be rotatably supported by the cover portion.

Other objects and advantages will appear in the following specification, and the novel features of the invention will be particularly pointed out in the appended claims.

Figure 5:
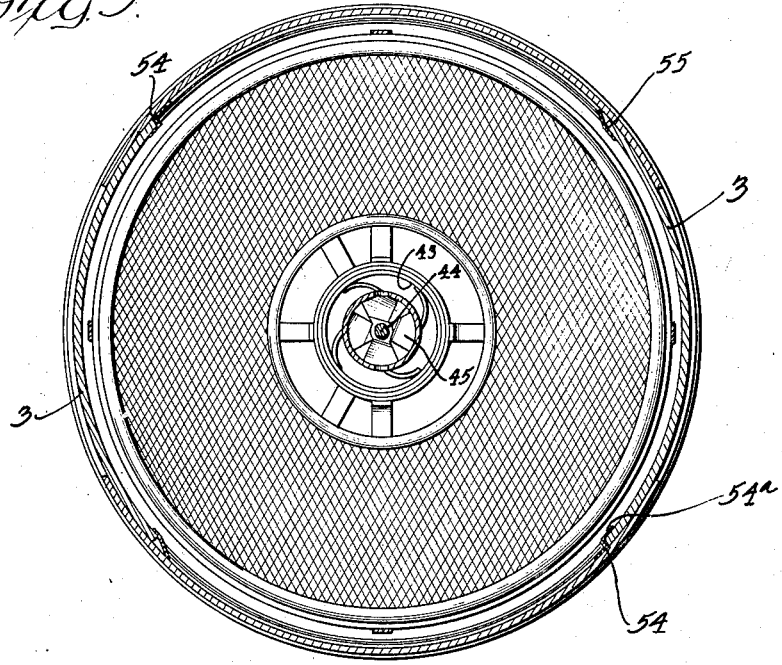
Figure 6:
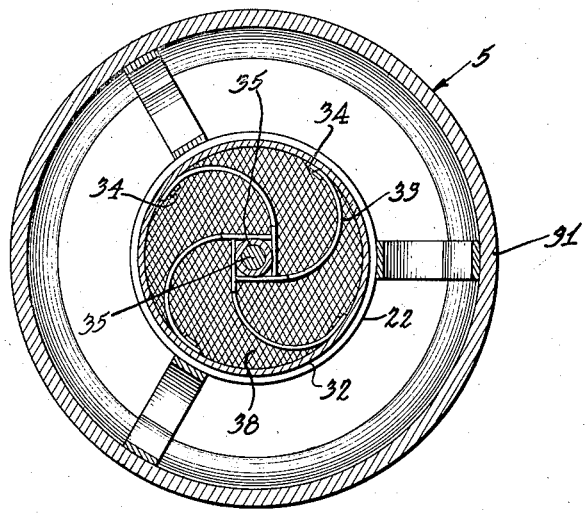

My invention is illustrated in the accompanying drawings, forming part of this application, in which Figure 1 is an elevational view of the device of my invention, Figure 2 is a vertical sectional view of the device of my invention showing certain portions thereof in elevation, Figure 3 is a vertical sectional view of a portion of my device, Figure 4 is a section taken along the line 4—4 of Figure 3, Figure 5 is a section taken along the line 5—5 of Figure 2, and Figure 6 is a section taken along the line 6—6 of Figure 2.

In carrying out my invention, I make use of a casing 1. The casing 1 consists of cylindrical wall sections 2, sliding doors 3, a cover section 4, and an inwardly inclined bottom portion 5. The casing 1 is supported in any suitable manner such as, for instance, by means of a rod or strap 6 and a hoop 7 which is connected together by means of a bolt or rivet 8. The rod or strap 6 and the hoop 7 is secured in any suitable manner to supports not shown.

The cover section 4 is constructed of an upper disc 9 and a lower disc 10 which are provided with rim portions 9a and 10a, respectively. The discs 9 and 10 are made of wood and are preferably positioned with respect to each other in such a manner that the grain of the wood in the upper disc 9 runs at right angles with the grain of the wood in the lower disc 10. The discs 9 and 10 are of such a size that the lower disc 10 and its rim 10a are nested within and beneath the upper disc 9 and its rim 9a. The discs 9 and 10 are connected together in any suitable manner. The cover section 4 is provided with a central opening 11. It may also be provided with vents 12. The vents 12 are closed by means of flaps 12a which are conveniently secured to the top of the cover section 4 in any suitable manner such as, for instance, by means of tacks 12b. The central opening 11 is internally threaded. A journal 13 is positioned within the opening 11. The journal 13 is externally threaded and secured in position by means of internally threaded washers 13a. A motor 14 is supported above the cover section 4 by means of a support 15 which is rigidly secured to the cover section. The motor 14 is so positioned that its shaft 14a is in alignment with the internal bore 13b of the journal 13. The motor shaft 14a is detachably but rigidly connected to a water cylinder 16 by means of a shaft 17, collars 18, and screws 18a. A freely fitting collar 19 may be rotatably secured to the lower portion of the journal 13. The collar 19 is provided with an internally threaded collar bearing member 20 which may be rigidly and adjustably secured to the journal 13 by means of a screw 20a. A plurality of frame bars 21 is fixedly secured to the collar 19 by rivets or bolts 22. The frame bars 21 extend outwardly at the top until they nearly reach the inner wall of the outer casing 1. These bars then extend downwardly until they reach the top of the inwardly inclined bottom portion 5. The bars 21 then extend inwardly and are all welded or otherwise secured to a metal ring 22a.

Metal bands 23, 24, and 25 are welded or otherwise secured to the bars 21 substantially as shown. The metal bands 23 and 24 are adapted to serve as supports for screens 26 and 26a, respectively. A similar screen 27 may be supported on the lower portion of the bars 21 substantially as shown. Each of these screens consists of inverted conical sections of wire 28 having their upper and outer ends reinforced by a circular rod 29 and their inner and lower ends similarly reinforced by a smaller ring 30. The conical sections of wire 28 and the rings 29 and 30 are fixedly secured together in any suitable manner such as, for instance, by welding. The lower part 31 of the bottom portion 5 forms the well of my device in which the hot or cold water may be held. A metallic cylinder section 32 is provided with vanes 33 which are fixedly secured at their outer ends to the cylindrical member 32 by means of brads or bolts 34. These vanes may be best seen in Figure 6 and they support at their inner ends a cylindrical journal or bearing 35. The journal is provided with an end thrust bearing member 36. The cylindrical journal 35 and the end thrust bearing member 36 are each rigidly connected together and are supported by the vanes 33 and the cylindrical member 32. It will be observed that the upper portion of the end thrust bearing member 36 is well below the upper end 37 of the journal 35. The lower end of the cylindrical member 32 is provided with a screen 38 which may be secured in any suitable manner to the member 32. The cylindrical member 32 is held well above the bottom of the well 31 by a supporting means 39 which may consist of angular hoop portions 40 and metallic bands 41 and 42. The hoops 40 and the bands 41 and 42 are rigidly secured together either by welding or by means of rivets or bolts not shown. If desired, the upper portion of the cylinder 32 may serve as a hub about which the metal band 22a may revolve.

On referring to Figures 2 and 3, it will be seen that the water cylinder 16 comprises a cylindrical wall member 43, a center shaft 44, and a plurality of staggered vane members 45. Each of these vane members is welded or otherwise secured to the cylindrical wall 43 and the central shaft 44. It will be observed that the base of the center shaft 44, when the cylinder is in its assembled position, is positioned within the cylindrical journal 35. If desired, the end of the center shaft 44 may abut against the end thrust bearing member 36. The cylindrical wall member 43 is provided with a plurality of staggered and spaced perforations 46. Each of these openings 46 is preferably positioned just opposite and above the center of the outer ends of the vane members 45.

The lower portion of the well is provided with a drain pipe 47. The drain pipe 47 may be provided with a rubber tubing 48 and a curved discharge member 49. When the well portion 31 is filled with water and the machine is being operated, the curved member 49 may be held above the well portion 31 by a hook or other suitable means not shown.

Referring to Figure 2, it will be seen that a curtain band member 50 is provided just inside the cylindrical wall portion 2 and the sliding doors 3 for the purpose of preventing any water from splashing out over the doors. The bottom of the sliding doors 3 may be reduced as is indicated at 51. The reduced portion 51 is slidably mounted at its lower portion in a band 52 which is provided with an annular groove 53. The doors 3 are provided with an elongated angular stop member 54 which is rigidly secured to the inner side of the cylindrical wall member 2. The front edge of the door is provided with a flap portion 55 for the purpose of preventing water from passing outwardly between the door 3 and the wall portion 2. The flat portion 55 is secured in any suitable manner to the door 2. It may, if desired, be made of rubber. It will be observed that the stop member 54 is provided with an extending portion 54a for the purpose of preventing the water from escaping.

The dishes may be disposed in any suitable manner about the water cylinder 16 although I preferably provide a dish-holding rack 56. The dish rack is preferably constructed of an outer ring 57, an inner ring 58, and a plurality of laterally extending and downwardly curved connecting members 59. The connecting members are connected near the central portion with downwardly extending loops 60 for the purpose of preventing the smaller dishes from falling into the screens. The doors, if desired, may be provided with any suitable handle portions.

From the foregoing description of the various parts of the device, the operation thereof may be readily understood.

When either of the doors 3 are open, the dishes may be placed in their desired position within the dish rack 56. The well 31 may be filled with water in any suitable manner such as, for instance, by means of a rubber hose connected with the hot water faucet. Soap, of course, may be used if desired. After the doors are closed, the motor may be started. The center shaft 44 and the vanes 45 will then be rotated rapidly. The vane portions are so designed as to lift the water upwardly as the vanes are rotated. When the vanes are positioned as shown in the accompanying figures, they are adapted to be rotated when viewed from above in a clockwise direction (see Figures 5 and 6). This, of course, tends to give the water a clockwise swirl as it is drawn upwardly through the bottom screen 38. The clockwise rotational movement given to the water is such that the water is guided inwardly by the spiral vanes 33. This inwardly guiding action of the vanes is such that in normal operation a substantially constant stream of water is fed to the central portion of the bottom of the water cylinder 16 where it is thrown outwardly by the rapidly rotating vanes 45 of the water cylinder in such a manner as to constantly pump such a large stream of water that the cylinder is kept filled. As the water passes the openings 46, a certain amount of the water will be thrown outwardly by centrifugal force in such a manner as to cause the water to strike the dishes with a force sufficient to cleanse them. If desired, the openings may be graduated in size, the top opening being the largest and the bottom opening being the smallest. By properly proportioning the size of the openings, an equal amount of water may be ejected from each opening. After the dishes have been washed, the water may be emptied out of the washing machine by lowering the rubber tube 48 and the curved end portion 49. The water may be discharged into an adjacent water basin. The dishes may be rinsed by filling the well member 31 with fresh water and running the motor for a short time.

It will be observed that the screens 25, 26, and 27 are adapted to hold any solid matter which may be removed from the dishes. It would also be observed that the screen 38 at the bottom of the cylindrical member 32 is adapted to prevent solid matter from entering into the water cylinder 16.

It will of course be understood that the device of my invention may be utilized for washing knives, forks, kitchen utensils, and the like, by supporting these articles in any suitable manner above the inverted conical sections 28.

In the present specification I have disclosed a form of my invention which is at present preferred by me as it has given, in practice, satisfactory reliable results. It is to be distinctly understood, however, that the various instrumentalities of which my invention consists can be variously arranged and organized, and that my invention is not limited to the precise arrangement and organization of these instrumentalities, as herein shown and described.

I claim:

1. A dish washer comprising a casing having a fixed top and a door in the side, a central vertical shaft extending through the top of the casing, an impeller fixed to the shaft within the casing and adapted when rotated to raise water from the bottom of the casing and to throw it on dishes in the casing, and means on the top of the casing to rotate the shaft.

2. A dish washer comprising a casing having a fixed top and a door in the side, a central vertical shaft extending through the top of the casing, a plurality of vertically spaced impellers secured to the shaft, a cylinder surrounding the impellers and being secured thereto, said cylinder being provided with outlet ports adjacent to said impellers whereby water may be propelled through said outlet ports on the dishes in the casing, and means on the top of the casing to rotate the shaft.

OLAF HOVDA.